United States Patent [19] [11] 4,314,136
Kotecki [45] Feb. 2, 1982

[54] TUBULAR COMPOSITE ARC WELDING ELECTRODE FOR VERTICAL UP WELDING OF STAINLESS STEEL

[75] Inventor: Damian J. Kotecki, Spring Garden Township, York County, Pa.

[73] Assignee: Teledyne Industries, Inc., Los Angeles, Calif.

[21] Appl. No.: 140,825

[22] Filed: Apr. 16, 1980

[51] Int. Cl.³ .................................................. B23K 35/30
[52] U.S. Cl. .................................. 219/146.23; 148/24; 148/26; 219/146.1
[58] Field of Search ..................... 219/146.1, 146.23; 148/24, 26

[56] References Cited

U.S. PATENT DOCUMENTS

| | | | |
|---|---|---|---|
| 2,895,863 | 7/1959 | Stringham | 148/26 |
| 2,955,193 | 10/1960 | Johnson | 148/24 X |
| 3,424,892 | 1/1969 | Wilcox | 219/146.23 X |
| 3,448,241 | 6/1969 | Buckingham | 219/146.1 |
| 3,551,217 | 12/1970 | Coless | 148/26 |
| 3,767,888 | 10/1973 | Sullivan | 219/146.23 X |
| 3,796,609 | 3/1974 | Gonzales | 148/24 |
| 3,805,016 | 4/1975 | Soejima | 219/146.23 X |
| 4,036,671 | 7/1977 | Haeck | 148/24 |
| 4,109,059 | 8/1978 | Haeck | 148/24 X |
| 4,214,141 | 7/1980 | Okuda | 148/26 X |

FOREIGN PATENT DOCUMENTS

| | | | |
|---|---|---|---|
| 228759 | 10/1958 | Australia | 148/26 |
| 824539 | 12/1959 | United Kingdom | 219/146.1 |

*Primary Examiner*—Richard R. Kucia
*Attorney, Agent, or Firm*—Charles J. Long

[57] ABSTRACT

In a tubular composite electrode for depositing stainless steel weld metal, satisfactory performance in vertical up welding is achieved through the inclusion in the electrode core of a slag mix comprising 15 to 60% weight percent zirconium dioxide.

3 Claims, No Drawings

TUBULAR COMPOSITE ARC WELDING ELECTRODE FOR VERTICAL UP WELDING OF STAINLESS STEEL

BACKGROUND OF THE INVENTION

1. Field of the Invention

This invention relates to tubular composite arc welding electrodes comprising a metallic outer sheath and a core within and enclosed by the sheath. More particularly, the invention relates to such electrodes balanced to deposit stainless steel weld metal, hereinafter referred to for convenience as tubular composite stainless steel electrodes, in which an improved core composition incorporating zirconium dioxide allows the electrodes to be used successfully in vertical up welding applications. My electrode is generally intended for gas-shielded semi-automatic arc welding, but with appropriate core modification within the scope of the invention it is also useful as a self-shielded electrode.

2. Description of the Prior Art

Many tubular composite arc welding electrodes have been developed for depositing stainless steel weld metal in automatic and semi-automatic welding processes. Such electrodes, whose popularity and acceptance is increasing, include those designed for gas-shielded arc welding, in which the welding arc is protected by gas supplied thereto from a source external to the electrode, and those known as self-shielded electrodes, in which components of the core provide arc shielding so that no external gas source is required. Examples of the former are the IN-FLUX* "G" wires produced and sold by Teledyne McKay, while examples of the latter are typified by U.S. Pat. No. 3,643,061, No. 4,149,063, and No. Re. 28,326. Although these and other tubular composite stainless steel electrodes provide sound, high quality weld deposits when used in the flat and horizontal positions, I am aware of none which can be used successfully in vertical up welding—i.e., where the weld metal is deposited in a vertical joint in an upward direction. In many cases the problem appears to be that the slags produced by such prior art in tubular composite stainless steel electrodes have relatively low melting points, such that in vertical up welding both the molten weld metal and the molten slag run or drip out of the weld joint.

*Registered trademark of Teledyne Industries, Inc.

Since many welds in stainless steel structures can be most conveniently and economically accomplished with vertical up welding, a tubular composite stainless steel electrode suitable for such applications would have significantly broader utility than the electrodes heretofore available.

SUMMARY OF THE INVENTION

I have discovered that use of relatively high amounts of zirconium dioxide ($ZrO_2$), along with other suitable non-metallic slagging and fluxing ingredients, in the core of a tubular composite stainless steel electrode will produce a high melting slag during welding, which slag enables deposition of sound, high quality weld metal in vertical up applications.

In accordance with the invention I provide, in a tubular composite arc welding electrode comprising a metallic outer sheath and a core within and enclosed by the sheath, of the type wherein the sheath and the metallic portion of the core are balanced to produce a stainless steel weld deposit, the improvement which comprises the non-metallic portion of the core consisting essentially of a slag mix constituting from six to fifteen weight percent of the electrode, the slag mix containing the following listed components in the proportions stated:

|  | Weight % of Slag Mix |
|---|---|
| Arc stabilizer selected from potassium titanate, sodium titanate and alkali metal oxides | up to 15 |
| Fluoride selected from calcium fluoride, magnesium fluoride, sodium fluoride, lithium fluoride, aluminum fluoride, potassium silicofluoride and cryolite | up to 50 |
| Silicon dioxide | up to 10 |
| Zirconium dioxide | 15 to 60 |
| Titanium dioxide | Balance. |

In a preferred embodiment especially suited for use in gas shielded welding, the slag mix has the following listed composition in weight percent;

|  | Weight % of Slag Mix |
|---|---|
| Potassium titanate | 5 to 8 |
| Potassium silicofluoride | 1 to 3 |
| Cryolite | 3 to 6 |
| Silicon dioxide | 3 to 6 |
| Zirconium dioxide | 15 to 25 |
| Titanium dioxide | Balance. |

In an embodiment usable in self-shielded welding, the slag mix has the following listed composition in weight percent;

|  | Weight % of Slag Mix |
|---|---|
| Fluoride | 20 to 50 |
| Zirconium dioxide | 35 to 60 |
| Arc stabilizer, silicon dioxide, titanium dioxide | Balance. |

DESCRIPTION OF THE PREFERRED EMBODIMENTS

In tubular composite stainless steel electrodes according to the invention, the sheath and the metallic portion of the core (including carbon, which is treated as a metal for formulation purposes) are balanced to produce a stainless steel weld deposit. Such balancing, commonly performed by those skilled in the art of tubular electrode formulation, involves consideration of losses of elements in crossing the welding arc, necessary deoxidation practice, and the aim analysis of the stainless steel alloy which it is desired to deposit.

In manufacturing tubular composite electrodes, the sheath material, supplied initially as flat strip, is first formed into a generally U-shaped trough; the mixture of powdered core materials is then added, after which the sheath is further formed to tubular shape to surround the core and compress it slightly to prevent shifting thereof. After initial forming the tubular electrode is drawn or rolled from the as-formed diameter to the desired final diameter, which in many cases involves a significant reduction in size.

As is known to those skilled in the art, the greater the percentage of electrode weight taken up by the core ("percent fill" hereinafter), the thinner the sheath must be and the more difficult it becomes to reduce the size of the formed tube. Consequently, if alloy sheath can be used in tubular composite stainless electrodes, the amount of alloy necessary in the core, and thus the necessary percent fill, will be decreased and the electrode will be easier to reduce to the smaller diameters often desired in welding stainless steel. For this reason I prefer to use type 304L stainless steel sheath (nominal 18.5% Cr, 9.5% Ni) in tubular composite electrodes according to the invention, although other sheath materials such as mild steel or type 404 ferritic steel, can be used satisfactorily in many cases.

As stated above, the core of tubular composite stainless steel electrodes according to the invention includes both a metallic portion for alloying and deoxidation purposes and a non-metallic slag mix which serves variously to stabilize the welding arc, reduce porosity and spatter, raise the electrode's voltage tolerance (i.e. the range of arc voltage over which the electrode is usable) and, most importantly, provide a high melting slag which will support the molten stainless steel weld pool in vertical up welding.

For best results, I have found that the slag mix should comprise from about 6 to about 15% of the electrode weight.

Potassium titanate, sodium titanate, and alkali metal oxides are suitable arc stabilizers in my electrode; these ingredients may be present in amounts up to about 15 weight percent of the slag mix. In electrodes for gas-shielded arc welding I prefer potassium titanate in amounts from about 5 to about 8 weight percent of the slag mix.

Fluorides in the slag mix of my electrode combat weld metal porosity and raise the electrode's voltage tolerance. Suitable fluorides for these purposes include calcium fluoride, magnesium fluoride, sodium fluoride, lithium fluoride, aluminum fluoride, potassium silicofluoride and cryolite; depending on the welding process in which the electrode is used, fluoride may be present in total amounts up to about 50 weight percent of the slag mix. For gas-shielded arc welding I prefer potassium silicofluoride and cryolite in respective amounts of from about 1 to about 3 and about 3 to about 6 weight percent of the slag mix, and for self-shielded welding I may use calcium fluoride and potassium silicofluoride in respective amounts of from about 25 to about 40 and about 3 to about 10 weight percent of the slag mix.

Spatter can be reduced in my electrode by use of silicon dioxide in amounts up to about 10 weight percent of the slag mix. $SiO_2$ in excess of this limit is undesirable because it tends to produce slag slivers which stick to the surface of the weld deposit.

Zirconium dioxide constitutes the key slag ingredient in my electrodes, as it causes formation of a high melting slag which supports the molten weld metal during vertical up welding. I have found that from about 15 to about 60 weight percent of the slag mix is necessary for this purpose. $ZrO_2$ over the upper limit causes the slag to freeze too fast and distort the weld bead, while amounts less than about 15 weight percent do not cause enough of an increase in slag melting point to allow vertical up welding. For gas-shielded arc welding, my electrodes preferably contain $ZrO_2$ from about 15 to about 25 weight percent of the slag mix, and for self-shielded arc welding I may use zirconium dioxide from about 35 to about 60 weight percent of the slag mix.

Titanium dioxide is used in my electrode primarily to add bulk to the slag to insure complete slag coverage of the weld metal. The amount used is that necessary to bring the total slag mix quantity to between about 6 and about 15 weight percent of the electrode; i.e., $TiO_2$ is used as the balance of any slag mix formulation.

Further details, objects and advantages of the invention will become apparent as the following description of certain present preferred embodiment thereof proceeds.

EXAMPLE 1

A tubular composite electrode for depositing Type 309L stainless steel weld metal by gas-shielded arc welding was fabricated using Type 304L stainless steel strip as the sheath; the core of the electrode comprised 24% of the electrode weight and was composed of the following listed granular ingredients in the stated weight percentages of the electrode: chromium metal 5.1%; nickel metal 4.3%; low carbon ferrochromium (73% Cr) 4.6%; manganese metal 0.7%: slag mix 9.3%. The slag mix consisted of the following listed ingredients in the stated weight percentages of the mix: potassium titanates 6.5%; potassium silicofluoride 2.1%; cryolite 4.3%; silicon dioxide 4.3%; zirconium dioxide 21.5%: titanium dioxide (as rutile) 61.3%. All core materials were sized to minus 30 U.S. mesh before being included in the core mixture. The electrode was drawn to 1/16" diameter and used to prepare the following described weld metal specimens by the semi-automatic gas-shielded arc welding process.

(a)

For determining chemical analysis and delta ferrite content of undiluted weld metal, the electrode was used to prepare a 7-layer weld pad, as described in A4.10 of American Welding Society Specification A5.4-78. Welding was performed in the flat position at 230 amps, 30 volts, DC reverse polarity, and ½" stick out, using 75% argon—25% $CO_2$ shielding gas. Analysis of the undiluted weld metal was as follows: carbon 0.034%; manganese 1.50%; silicon 0.44%; chromium 24.28%; nickel 12.94%; sulfur 0.010%; phosphorus 0.023%; iron and unavoidable impurities, balance. Delta ferrite of the deposit, measured using a Magne-Gage, was 9.5 FN.

(b)

A single vee weldment was prepared in the vertical up position using ¾" thick Type 304 stainless steel plate, a 45° included angle, ¼" root opening and ⅜"×1" Type 304 backing bar. The electrode was run at 180 amps, 26 volts, DC reverse polarity and ½" stick out; 75% argon-25% $CO_2$ shielding gas was used. Weld metal was deposited using a weave pattern in five single-bead layers, the first layer extending the full length of the joint and each succeeding layer extending over a shorter distance than the prior layer, so that the surface appearance of all five layers would be visible in one weldment.

The vertical up weld metal so produced had satisfactory bead contour and tie-in to the base metal in all five layers. A polished and etched cross-section of the five-layer end of the specimen revealed that both soundness and metallurgical structure of the weld metal were at least equal to weld metal deposited in the flat position by tubular composite stainless steel electrodes of the prior art.

(c)

A second single vee weldment was prepared in the flat position using Type 304 stainless steel base plate and backup bar; the weldment had the same geometry as in (a) except that the root opening was ½". The electrode was run at 230 amps, 30 volts, DC reverse polarity and ½" stickout; 75% argon-25% CO₂ shielding gas was used. The joint was filled with 7 layers of weld metal, two beads per layer, maintaining a 300 F interpass temperature.

An all-weld-metal tensile bolt machined from the weldment showed the following listed properties: tensile strength 82,500 psi; yield strength 61,100 psi (0.2% offset); elongation 40.5%; reduction in area 51.3%.

Two side bend specimens were prepared from the weldment according to the requirements of QW462.2 (a) and QW463.1 (b) of Section IX of the ASME Boiler and Pressure Vessel Code, and tested in a jig meeting the requirements of QW466.1 of the same document. Both specimens passed.

(d)

A third single vee weldment was prepared in the vertical up position using the same parameters and joint design as in (a). In this case, however, the joint was filled with five layers of weld metal, one bead per layer, using a weave pattern and maintaining a 300 F interpass temperature.

An all-weld-metal tensile bolt machined from this weldment showed the following listed properties: tensile strength 88,400 psi; yield strength 57,300 psi (0.2% offset); elongation 36.5%; reduction of area 47.3%.

Two side bend specimens were prepared from the weldment and tested according to the ASME requirements set forth under (c) above. Both specimens passed.

As is evident from the foregoing, vertical up welding with electrodes according to the invention produces weld metal essentially equivalent in strength, ductility and soundness to that produced in flat welding.

In vertical up gas shielded welding with the electrode of Example 1, the transfer with 75% argon-25% CO₂ shielding gas was spray-like with very low spatter; with CO₂ or 90% He-7.5% Ar-2.5% CO₂ shielding gases, spatter increased slightly but operation was still quite acceptable. Neither pure argon nor argon-1% O₂ is compatible with electrodes according to the invention.

EXAMPLE 2

A tubular composite electrode for depositing Type 309L stainless steel weld metal by the self-shielded process was fabricated using Type 304L stainless steel strip as the sheath; the core of the electrode comprised 26% of the electrode weight and was composed of the following listed granular ingredients in the stated weight percentages of the electrode: chromium metal 9.78%; nickel metal 4.76%; manganese metal 1.00%; slag mix 10.4%. The slag mix consisted of the following listed ingredients in the stated weight percentages of the mix: potassium titanate 2.6%; calcium fluoride 29.6%; potassium silicofluoride 5.9%; zirconium dioxide 39.1%; titanium dioxide (as rutile) 22.8%. After forming, the electrode was drawn to 1/16" diameter and welded vertical up at 180 amps, 26 volts, DC reverse polarity, and ½" stickout. Although operation was not as attractive as that of the gas-shielded electrode of Example 1, showing a ball-like transfer and rather high spatter, the electrode deposited sound weld metal with acceptable contour and tie-in.

While I have described certain present preferred embodiments of the invention, it is to be distinctly understood that the invention is not limited thereto but may be otherwise variously embodied within the scope of the following claims.

I claim:

1. In a tubular composite arc welding electrode comprising a metallic outer sheath and a core within and enclosed by the sheath, of the type wherein the sheath and the metallic portion of the core are balanced to produce a stainless steel weld deposit, the improvement which comprises providing a non-metallic portion of the core which consists essentially of a slag mix constituting from 6 to 15 weight percent of the electrode, the slag mix containing the following listed components in the proportions stated:

|  | Weight percent of Slag Mix |
| --- | --- |
| Arc stabilizer selected from potassium titanate, sodium titanate and alkali metal oxide | up to 15 |
| Fluoride selected from calcium fluoride, magnesium fluoride, sodium fluoride, lithium fluoride, aluminum fluoride, potassium silicofluoride, and cryolite | up to 50 |
| Silicon dioxide | up to 10 |
| Zirconium dioxide | 15 to 60 |
| Titanium dioxide | balance. | whereby the electrode operates satisfactorily in vertical up welding.

2. A tubular composite electrode as claimed in claim 1 in which the slag mix has the following listed composition in weight percent:

|  | Weight percent of Slag Mix |
| --- | --- |
| Potassium titanate | 5 to 8 |
| Potassium silicofluoride | 1 to 3 |
| Cryolite | 3 to 6 |
| Silicon dioxide | 3 to 6 |
| Zirconium dioxide | 15 to 25 |
| Titanium dioxide | balance |

3. A tubular composite electrode as claimed in claim 1, in which the slag mix has the following listed composition in weight percent:

|  | Weight percent of Slag Mix |
| --- | --- |
| Fluoride | 20 to 50 |
| Zirconium dioxide | 35 to 60 |
| Arc stabilizer, silicon dioxide titanium dioxide | balance |

* * * * *